United States Patent
Tong et al.

(10) Patent No.: US 8,934,563 B2
(45) Date of Patent: Jan. 13, 2015

(54) METHOD AND DEVICE FOR FEEDING BACK PRE-CODING MATRIX INDEX OF DUAL-POLARIZED ANTENNA

(75) Inventors: Hui Tong, Beijing (CN); Ming Xu, Beijing (CN); Masayuki Hoshino, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 235 days.

(21) Appl. No.: 13/582,848
(22) PCT Filed: Feb. 21, 2011
(86) PCT No.: PCT/CN2011/071114
§ 371 (c)(1),
(2), (4) Date: Oct. 30, 2012
(87) PCT Pub. No.: WO2011/110064
PCT Pub. Date: Sep. 15, 2011

(65) Prior Publication Data
US 2013/0064317 A1 Mar. 14, 2013

(30) Foreign Application Priority Data
Mar. 10, 2010 (CN) .......................... 2010 1 0123952

(51) Int. Cl.
*H04B 7/02* (2006.01)
*H04L 1/02* (2006.01)
(Continued)

(52) U.S. Cl.
CPC ............ *H04B 7/0363* (2013.01); *H04B 7/0469* (2013.01); *H04B 7/10* (2013.01); *H04B 7/0634* (2013.01); *H04B 7/0639* (2013.01); *H04B 7/065* (2013.01)
USPC ........... 375/267; 375/295; 455/452.2; 455/69

(58) Field of Classification Search
CPC ............................ H04B 7/0639; H04B 7/0643
USPC .......................... 375/267, 295; 455/452.2, 69
See application file for complete search history.

(56) References Cited

U.S. PATENT DOCUMENTS
4,688,045 A * 8/1987 Knudsen ........................ 342/377
2009/0325591 A1* 12/2009 Liu et al. ..................... 455/452.2
(Continued)

FOREIGN PATENT DOCUMENTS
CN 1956430 A 5/2007
CN 101316156 A 12/2008
(Continued)

OTHER PUBLICATIONS
IEEE C802.16m_MIMO-08/1182 Broadband Wireless Access Working Group, "Codebook design for IEEE 802.16m MIMO Schemes", Sep. 10, 2008, Qinghua, et al.
(Continued)

*Primary Examiner* — Sam K Ahn
*Assistant Examiner* — Fabricio R Murillo Garcia
(74) *Attorney, Agent, or Firm* — Pearne & Gordon LLP

(57) ABSTRACT

There is provided a method and device for feeding back a pre-coding matrix index of a dual-polarized antenna which has a first antenna array and a second antenna array and is arranged at a base station to which the index of a first pre-coding matrix for the first antenna array, the index of a second pre-coding matrix for the second antenna array and the phase offset between the first pre-coding matrix and the second pre-coding matrix are fed back from a terminal, comprising: computing a distance between the first pre-coding matrix and the second pre-coding matrix; judging whether the distance is larger than a predetermined threshold or not; and assigning less bits to indicate the phase offset if the distance is larger than the predetermined threshold. The method and device according to the present disclosure can effectively advance the feedback accuracy of a system thus improving the bit error rate and throughput of the system.

19 Claims, 5 Drawing Sheets

(51) Int. Cl.
*H04B 7/04* (2006.01)
*H04B 7/10* (2006.01)
*H04B 7/06* (2006.01)

(56) References Cited

U.S. PATENT DOCUMENTS

2010/0284484 A1* 11/2010 Jongren et al. ............... 375/267
2011/0045783 A1 2/2011 Luschi et al.
2011/0064156 A1* 3/2011 Kim et al. .................... 375/267
2012/0108178 A1* 5/2012 Lee et al. ..................... 455/67.11

2013/0148755 A1* 6/2013 Melzer et al. ................ 375/267

FOREIGN PATENT DOCUMENTS

WO 2009/087198 A2 7/2009
WO WO 2009087198 A2 * 7/2009

OTHER PUBLICATIONS

International Search Report for PCT/CN2011/071114 dated Jun. 9, 2011.

* cited by examiner

METHOD AND DEVICE FOR FEEDING BACK PRE-CODING MATRIX INDEX OF DUAL-POLARIZED ANTENNA

TECHNICAL FIELD

The present disclosure relates to technologies of multi-antenna transmission (MIMO (Multiple Input Multiple Output)/Beam-forming), CoMP (Coordinated Multiple Points) and dual-polarized antenna in the field of communication.

BACKGROUND ART

The multi-antenna technology is an important constitutional portion of the fourth generation wireless communication such as LTE-advanced. One important application in the multi-antenna technology is the closed-loop downlink pre-coding. In such application, a client (terminal) measures a downlink channel from a base station to the client. The client then proposes a corresponding pre-coding matrix to the base station. This proposition is sent to the base station via a feedback link. Finally, in a downlink transmission, the base station may adopt directly the proposed pre-coding matrix.

In the above procedure, one important step is how to feed back the proposed pre-coding matrix. The most commonly used means is a manner of codebook based feedback. This manner first defines one codebook containing multiple pre-coding matrixes. The codebook is known for both the base station and the client. If the client proposes a certain pre-coding matrix in the codebook, an index corresponding to the pre-coding matrix is fed back to the base station. For instance, a certain codebook contains four pre-coding matrixes, which are indexed, each by two bits, as {00, 01, 10, 11}. If the client proposes the base station to use the second pre-coding matrix, the bits {01} are sent to the base station. The base station thereby selects the pre-coding matrix corresponding to the bits {01} to send signals. Such manner of pre-coding matrix index (PMI) based feedback can achieve a better performance in reducing the feedback overhead and assuring a high downlink throughput and so on.

There is another important subject in the fourth generation wireless communication system standardization is support for downlink multi-antenna such as eight emission antennas. In a specific implementation, the eight downlink emission antennas are located at an appropriate position of a base station which emits signals to be transmitted to a receiving end (terminal) via the eight emission antennas. One important implementation for eight emission antennas is eight dual-polarized antennas.

FIG. 1 is a diagram showing the configuration of the eight dual-polarized antennas.

The configuration of the dual-polarized antenna is shown as FIG. 1, in which antennas a, b, c and d are polarized at positive 45 degree while antennas a', b', c' and d' are polarized at negative 45 degree, and respective pairs of antennas a and a', b and b', c and c' as well as d and d' are respectively located at the same physical position. Since the space between the dual-polarized antennas is usually half-wavelength, i.e. $0.5\lambda$, the antennas a, b, c and d have a certain correlation, and the antennas a', b', c' and d' have a certain correlation. Meanwhile, a first antenna array (including the antennas a, b, c and d) and a second antenna array (including the antennas a', b', c' and d') are independent from each other.

FIG. 2 is a diagram showing equivalent channels for the eight dual-polarized antennas.

Actually, the channels of the eight dual-polarized antennas can be equivalently considered as two antenna arrays as shown in FIG. 2, in which each of the antenna arrays contains four antennas (the antennas a, b, c and d as well as the antennas a', b', c' and d' respectively). The channels of four antennas of one antenna array are correlated channels, while the channels of the two antenna arrays are independent from each other.

In the eight dual-polarized antennas as described above, a client may receive signals from the two antenna arrays. Since a basic codebook design manner is to feed back the index of the pre-coding matrix for a single antenna array, there are indexes corresponding to two pre-coding matrixes required to be fed back to the base station, wherein each of the pre-coding matrixes corresponds to one antenna array. Furthermore, the phase offset between the two pre-coding matrixes is also required to be fed back to the base station such that the signals of the two antenna arrays can be combined coherently at the client. Therefore, the feedback with respect to the eight dual-polarized antennas as shown in FIG. 1 and FIG. 2 may include three portions:

1) the index corresponding to a pre-coding matrix of the first four-antenna array;
2) the index corresponding to a pre-coding matrix of the second four-antenna array; and
3) the phase offset between the channels of the two antenna arrays.

FIG. 3 (A) and FIG. 3(B) are respectively schematic diagrams showing the comparison of four-antenna feedbacks based on a double codebook and a single codebook.

A general means for feeding back the index of a pre-coding matrix for a four-antenna array is a method employing a single codebook, as shown in FIG. 3 (A). In the method as shown in FIG. 3 (A), one codebook is used to represent pre-coding matrixes of one antenna array (directions of respective antenna channels), wherein, for example, the index corresponding to the pre-coding matrix is formed by four bits (represented by four blocks), and the feedback is performed from a terminal to a base station in a short period (e.g. 10 ms). In FIG. 3 (A), the directions of different pre-coding matrixes of the antenna array of the base station are represented by positions of light colored circles.

Another known means for feeding back the index of a pre-coding matrix for a four-antenna array is a method employing a double codebook, as shown in FIG. 3 (B). In the method as shown in FIG. 3 (B), the four antennas in the antenna array are assumed to experience channels with high spatial correlation, so that instantaneous channel directions represented by the positions of light colored circles in FIG. 3 (B) generally fluctuate around an average (long-term) channel direction represented by the position of a deep colored circle in FIG. 3 (B). In the double codebook design, the above four bits are divided into two groups. The former two bits are used to constitute indexes of pre-coding matrixes of the first codebook for feeding back a long-term channel direction, which is referred to as a long-term pre-coding matrix index later. The latter two bits are used to constitute indexes of pre-coding matrixes of the second codebook for feeding back the difference between the long-term channel direction and the instantaneous channel direction which is referred to as an instantaneous pre-coding matrix index. Since the variation of the long-term channel direction is slow, a long period (for example 100 ms) can be used to feed back it. However, the variation of the difference between the instantaneous channel direction and the long-term channel direction is fast, thus a short period (for example 10 ms) is required to feed back it. Therefore, the employment of the double codebook method can effectively reduce feedback overhead or increase feedback accuracy.

The double codebook method may be directly applied to the eight dual-polarized antennas, and the corresponding feedback includes:

1) a long-term pre-coding matrix index and an instantaneous pre-coding matrix index corresponding to a first antenna array;

2) a long-term pre-coding matrix index and an instantaneous pre-coding matrix index corresponding to a second antenna array; and 3) the phase offset between the channels of the first antenna array and the second antenna array.

FIG. 4 is a diagram showing the pre-coding matrix indexes corresponding to the two antenna arrays respectively.

Here, it is defined that a first pre-coding matrix index corresponding to the first antenna array includes a first long-term pre-coding matrix index (indicated by the former two bits) and a first instantaneous pre-coding matrix index (indicated by the latter two bits), and a second pre-coding matrix index corresponding to the second antenna array includes a second long-term pre-coding matrix index (indicated by the former two bits) and a second instantaneous pre-coding matrix index (indicated by the latter two bits). Phase offset is generally considered as instantaneous information, and it is fed back in a short period. Here, the phase offset between the two pre-coding matrixes is indicated for example by two bits (represented by two blocks). Wherein, the first long-term pre-coding matrix index and the second long-term matrix index are fed back using long periods, and the first instantaneous pre-coding matrix index, the second instantaneous matrix index and the phase offset are fed back using short periods.

SUMMARY OF THE DISCLOSURE

The present disclosure proposes a method and a device for adaptively adjusting the assignment for the number of bits among a phase offset, a first instantaneous pre-coding matrix index and a second instantaneous pre-coding matrix index according to the distance between the first long-term pre-coding matrix and the second long-term pre-coding matrix.

According to one aspect of the present disclosure, there is provided a method of feeding back a pre-coding matrix index of a dual-polarized antenna which has a first antenna array and a second antenna array and is arranged at a base station to which the index of a first pre-coding matrix for the first antenna array, the index of a second pre-coding matrix for the second antenna array and the phase offset between the first pre-coding matrix and the second pre-coding matrix are fed back from a terminal, comprising: computing a distance between the first pre-coding matrix and the second pre-coding matrix; judging whether the distance is larger than a predetermined threshold or not; and assigning less bits to indicate the phase offset, if the distance is larger than the predetermined threshold.

According to another aspect of the present disclosure, there is provided a device for feeding back a pre-coding matrix index of a dual-polarized antenna which has a first antenna array and a second antenna array, and it is arranged at a base station to which the index of a first pre-coding matrix for the first antenna array, the index of a second pre-coding matrix for the second antenna array and the phase offset between the first pre-coding matrix and the second pre-coding matrix are fed back from the terminal, comprising: a computation means for computing a distance between the first pre-coding matrix and the second pre-coding matrix; a judgment means for judging whether the distance is larger than a predetermined threshold or not; and a processing means for assigning less bits to indicate the phase offset, if the distance is larger than the predetermined threshold.

The method and device according to the present disclosure can effectively increase the feedback accuracy of a system thus improving the bit error rate and throughput of the system.

BRIEF DESCRIPTION OF THE DRAWINGS

These and/or other aspects and advantages of the present disclosure will become more distinct and more easily understood from a detailed description of the embodiments of the present disclosure in combination with the attached drawings, in which.

DESCRIPTION OF THE EMBODIMENTS

Figure 1:
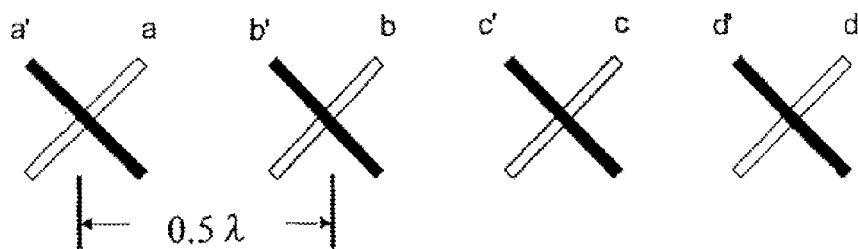
FIG. 1 is a diagram showing a configuration of the eight dual-polarized antennas.

In the following, some specific embodiments of the present disclosure will be described in detail with reference to attached drawings. If the detailed description of some related art may confuse the main points of the disclosure, the detailed description thereof will not be provided here. In respective embodiments, identical reference numerals are used to denote elements or units performing the same functions.

Figure 5:
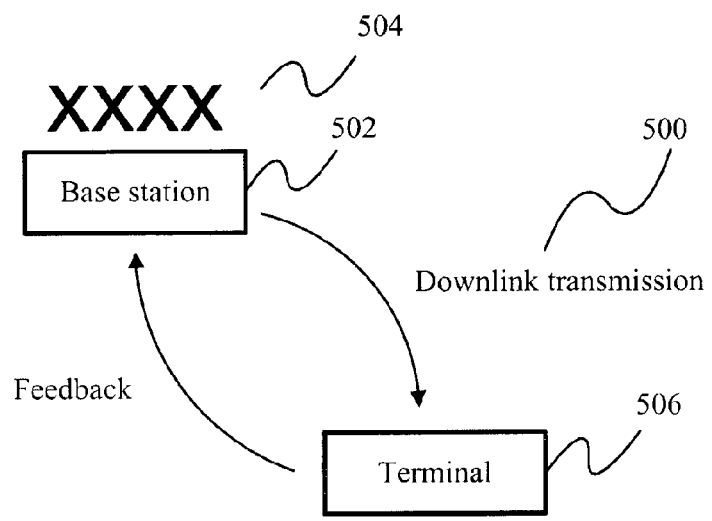
FIG. 5 is a schematic diagram showing a communication system applying the technical scheme of the present disclosure.

FIG. 5 is a schematic diagram showing a communication system applying the technical scheme of the present disclosure.

Figure 2:
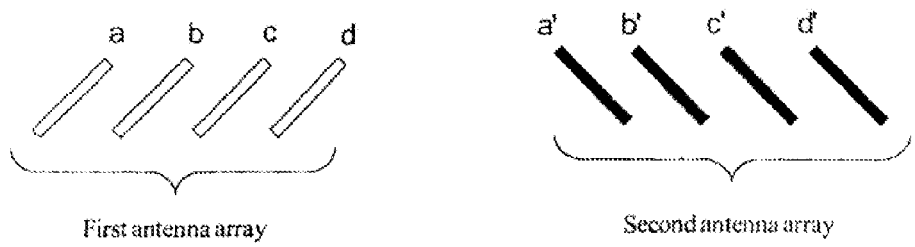
FIG. 2 is a diagram showing the equivalent channels of the eight dual-polarized antennas.
Figure 3:
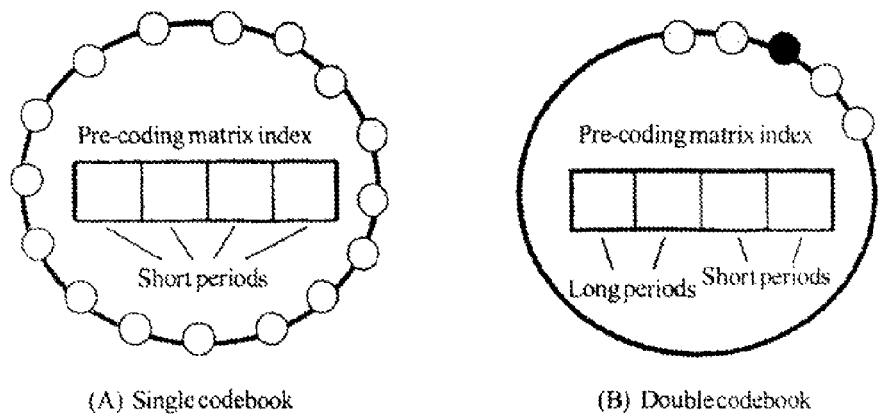
FIG. 3(A) and FIG. 3(B) are schematic diagrams showing the comparison of four-antenna feedbacks based on a double codebook and a single codebook respectively.
Figure 4:
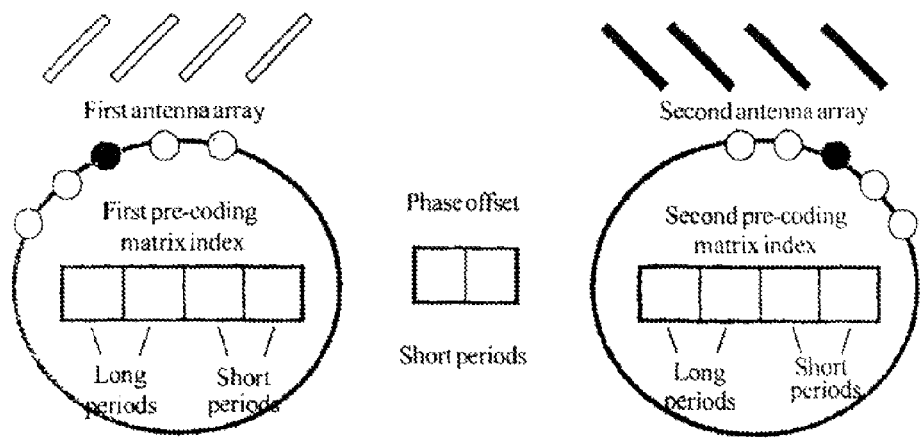
FIG. 4 is a diagram showing the pre-coding matrix indexes corresponding to two antenna arrays respectively.

As shown in FIG. 5, the communication system 500 according to the present disclosure includes at least one base station 502, at least one terminal 506 and a dual-polarized antenna 504 configured at the base station 502. The dual-polarized antenna 504 according to the present disclosure may be the eight dual-polarized antennas as shown in FIG. 1, or it may be other forms or numbers of dual-polarized antennas. As shown in FIG. 1 or FIG. 2, the dual-polarized antenna 504 according to the present disclosure may include a first antenna array of a, b, c and d and a second antenna array of a', b', c' and d'. The terminal 506 measures the downlink transmission channels of the base station 502, and it feeds back to the base station 502 the index of a first pre-coding matrix corresponding to the first antenna array of a, b, c and d, the index of a second pre-coding matrix corresponding to the second antenna array of a', b', c' and d', and the phase offset between the first pre-coding matrix and the second pre-coding matrix.

The number of antennas included in each antenna array of a dual-polarized antenna does not limit the scope of the present disclosure, and it may include any number of antennas, for example, two, four, eight and so on.

According to one embodiment of the present disclosure, when the distance between the first pre-coding matrix corresponding to the first antenna array and the second pre-coding matrix corresponding to the second antenna array is varied, the requirement for the feedback accuracy of the phase offset is different. When the distance between the first pre-coding matrix and the second pre-coding matrix is short, the phase offset is required to be fed back more accurately. On the other hand, when the distance between the first pre-coding matrix and the second pre-coding matrix is long, the feedback accuracy of the phase offset may be lower. Thus, the feedback accuracy of the phase offset may be adjusted adaptively according to the distance between respective pre-coding matrixes.

Figure 6:
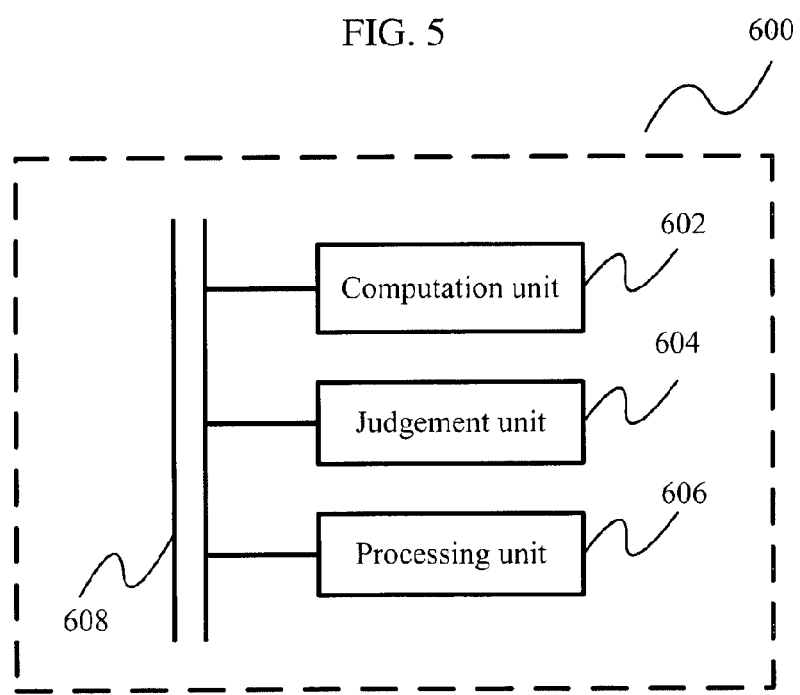
FIG. 6 is a block diagram showing a device for feeding back the index of a pre-coding matrix of a dual-polarized antenna according to the present disclosure.

FIG. 6 is a block diagram showing a device for feeding back the index of a pre-coding matrix of a dual-polarized antenna according to the present disclosure.

The device 600 for feeding back the index of a pre-coding matrix of a dual-polarized antenna according to the present disclosure is configured on the terminal 506. As shown in FIG. 6, the device 600 for feeding back the index of a pre-coding matrix of a dual-polarized antenna according to the present disclosure includes a computation means 602, a judgment means 604 and a processing means 606. The above computation means 602, judgment means 604 and processing means 606 are connected with each other via a bus or a suitable type of cable 608.

The device 600 for feeding back the index of a pre-coding matrix of a dual-polarized antenna according to the present disclosure may further include: a CPU (Central Processing Unit) for executing related programs so as to process various data and to control operations of respective units in the device 600; a ROM (Read Only Memory) for storing various programs required for CPU to perform various process and control; a RAM (Random Access Memory) for storing intermediate data temporarily produced by the CPU in the procedure of process and control; an I/O (Input/Output) component for connecting with external devices and transferring various data between external devices and the device 600 and so on.

The above respective components do not limit the scope of the present disclosure. According to one embodiment of the present disclosure, the function(s) of one or more of the computation means 602, the judgment means 604 and the processing means 606 may also be realized by functional software in combination with the above CPU, ROM, RAM, I/O and so on. Also, the function(s) of one or more of the computation means 602, the judgment means 604 and the processing means 606 may be implemented by combining into one unit.

According to one embodiment of the present disclosure, the computation means 602 computes the distance between a first pre-coding matrix corresponding to a first antenna array and a second pre-coding matrix corresponding to a second antenna array. The judgment means 604 judges whether the computed distance is larger than a predetermined threshold or not. In a case that the computed distance is larger than the predetermined threshold as described above, the processing means 606 assigns less bits to indicate the phase offset between the first pre-coding matrix and the second pre-coding matrix. On the other hand, In a case that the computed distance is not larger than the predetermined threshold as described above, the processing means 606 assigns more bits to indicate the above phase offset.

The magnitude of the predetermined threshold as described above does not limit the scope of the present disclosure. Those skilled in the art may specifically define the magnitude of the predetermined threshold in accordance with the characteristics of a communication system applying the technical scheme of the present disclosure.

In a case of employing a double codebook, that is, employing two codebooks to indicate the pre-coding matrix corresponding to one antenna array, a first pre-coding matrix may be divided into a first long-term pre-coding matrix and a first instantaneous pre-coding matrix, and a second pre-coding matrix may be divided into a second long-term pre-coding matrix and a second instantaneous pre-coding matrix. Actually, the distance between the first pre-coding matrix and the second pre-coding matrix is decided by the distance between the first long-term pre-coding matrix and the second long-term pre-coding matrix. In this way, the bit assignment among the first instantaneous pre-coding matrix index, the second instantaneous pre-coding matrix and the phase offset may be adjusted according to the distance between the first long-term pre-coding matrix and the second long-term pre-coding matrix. Thus, according to one embodiment of the present disclosure, the computation means 602 computes the distance between the first long-term pre-coding matrix and the second long-term pre-coding matrix as the above distance between the first pre-coding matrix and the second pre-coding matrix, and thereby assigns the number of bits indicating the instantaneous pre-coding matrix and the phase offset. If the distance between the first long-term pre-coding matrix and the second long-term pre-coding matrix is long, a small number of bits can be assigned to the phase offset. If the distance between the first long-term pre-coding matrix and the second long-term pre-coding matrix is short, a large number of bits can be assigned to the phase offset.

FIG. 7(A) and FIG. 7(B) are diagrams respectively showing the distance between a long-term pre-coding matrix and an instantaneous pre-coding matrix.

In both FIG. 7(A) and FIG. 7(B), two codebooks are used to indicate the pre-coding matrix corresponding to one antenna array, that is, the first pre-coding matrix corresponding to the first antenna array may include a first long-term pre-coding matrix (represented by the former two bits) and a first instantaneous pre-coding matrix (represented by the latter two bits), and the second pre-coding matrix corresponding to the second antenna array may include a second long-term pre-coding matrix (represented by the former two bits) and a second instantaneous pre-coding matrix (represented by the latter two bits).

As shown in FIG. 7(A), it can be seen from the positions of the long-term channel directions 701 and 703 that the distance from the first long-term pre-coding matrix (long-term channel direction) 701 and the first instantaneous pre-coding matrix (instantaneous channel direction) 702 corresponding to the first antenna array to the second long-term pre-coding matrix (long-term channel direction) 703 and the second instantaneous pre-coding matrix (instantaneous channel direction) 704 corresponding to the second antenna array is short, thereby more bits are assigned to the phase offset between the channels of the first antenna array and the second antenna array (the first pre-coding matrix and the second pre-coding matrix). It is shown here that two bits are assigned to indicate the phase offset, thus the feature of the phase offset can be fed back accurately so as to improve the communication quality.

As shown in FIG. 7(B), it can be seen from the positions of the long-term channel directions 701 and 703 that the distance from the first long-term pre-coding matrix (long-term channel direction) 701 and the first instantaneous pre-coding matrix (instantaneous channel direction) 702 corresponding to the first antenna array to the second long-term pre-coding matrix (long-term channel direction) 703 and the second instantaneous pre-coding matrix (instantaneous channel direction) 704 corresponding to the second antenna array is long, thereby less bits are assigned to the phase offset between the channels of the first antenna array and the second antenna array (the first pre-coding matrix and the second pre-coding matrix). It is shown here that one bit is assigned to indicate the phase offset, thus the communication throughput can be improved.

According to one embodiment of the present disclosure, at the terminal side, since the variations of the first long-term pre-coding matrix and the second long-term pre-coding matrix are slow, long periods may be used to feed back the first long-term pre-coding matrix index and the second long-term pre-coding matrix index. However, the variations of the first instantaneous pre-coding matrix, the second instantaneous pre-coding matrix and the phase offset are fast, so that short periods are needed to feed back the first instantaneous pre-coding matrix index, the second instantaneous pre-coding matrix index and the phase offset.

Figure 7:
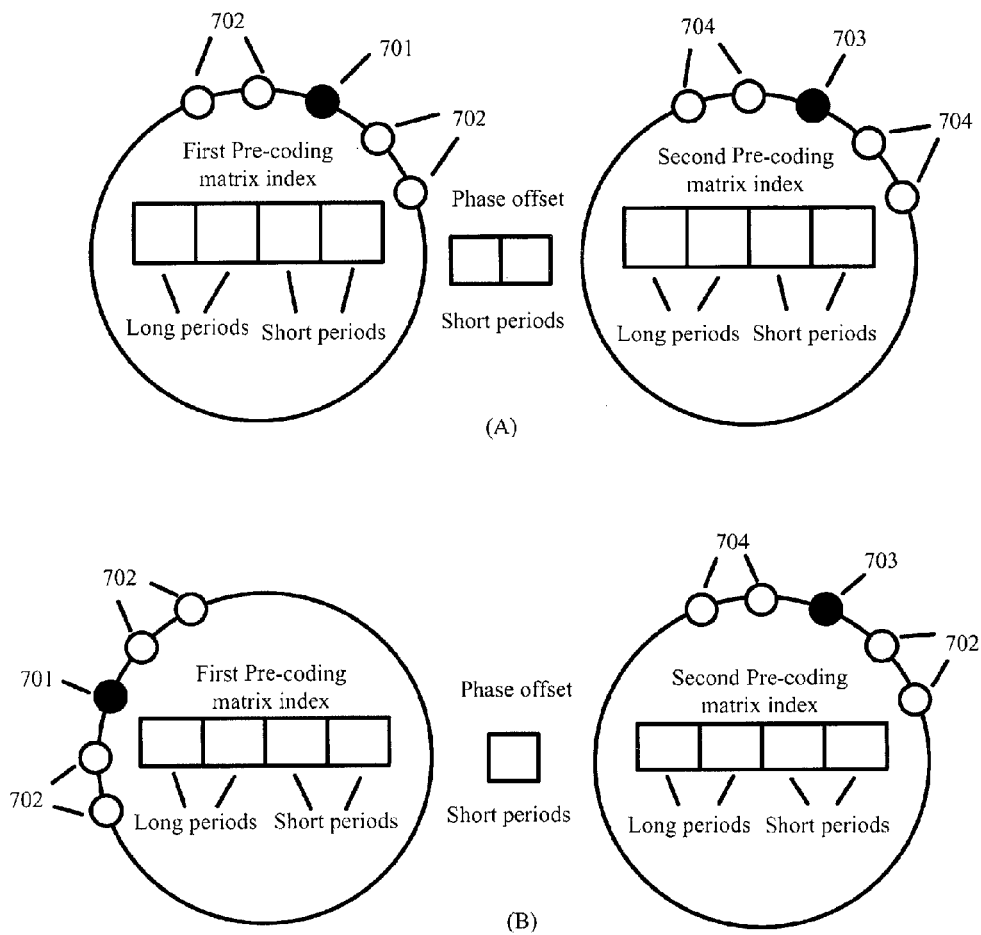
FIG. 7(A) and FIG. 7(B) are diagrams showing the distance between a long-term pre-coding matrix and an instantaneous pre-coding matrix respectively.

According to one embodiment of the present disclosure, a fixed number of bits can be used to indicate the first instantaneous pre-coding matrix index, the second instantaneous pre-coding matrix index and the phase offset. For example, in one instance, nine bits in total are used to construct the first instantaneous pre-coding matrix index, the second instantaneous pre-coding matrix index and the phase offset with three bits forming the first instantaneous pre-coding matrix index, three other bits forming the second instantaneous pre-coding matrix index and the remaining three bits forming the phase offset between the channels of the two antenna arrays. When the judgment means 604 of the device 600 of the present disclosure judges that the distance between the first long-term pre-coding matrix and the second long-term pre-coding matrix which correspond to the two antenna arrays respectively is larger than a predetermined threshold in accordance with the result computed by the computation means 602 (as shown by the positions of 701 and 703 in FIG. 7(B), when the distance thereof is large), the processing means 606 assigns less bits to indicate the phase offset between the channels of the first antenna array and the second antenna array. In FIG. 7 (A) and FIG. 7 (B), it is shown that the number of bits indicating the phase offset is reduced from two to one. In another instance, for example, the number of bits indicating the phase offset may be reduced from three to two or one so as to decrease the overhead of feedback by the terminal thus increasing the throughput of the communication system.

According to another embodiment of the present disclosure, after appropriate bits are assigned to indicate the phase offset in accordance with the computed distance, the remaining bits can be assigned to indicate the first instantaneous pre-coding matrix index and the second instantaneous pre-coding matrix index, that is, the remaining bits by the reduction of the bits indicating the phase offset may be used to construct the instantaneous pre-coding matrix indexes. For example, the number of bits indicating the phase offset is reduced from three to one, and the numbers of bits indicating the first instantaneous pre-coding matrix index and the second instantaneous pre-coding matrix index are respectively increased from three to four, thereby the accuracy for feedback of the instantaneous pre-coding matrix index can be increased and the communication quality of the communication system may be improved.

According to one embodiment of the present disclosure, it is assumed that the two pre-coding matrixes are F1 and F2 respectively, and the dimension of a pre-coding matrix is the number of antennas multiplied by a rank. In other words, if the rank is two, and the number of emission antennas is eight, the dimension of the pre-coding matrixes F1 and F2 is 8×2. In this way, a method of computing the distance between the first pre-coding matrix and the second pre-coding matrix may for example employ the equation as follows.

Chord distance:

$$d_{chord}(F_1, F_2) = \frac{1}{\sqrt{2}} \|F_1 F_1^H - F_2 F_2^H\|_F$$

Wherein, $d_{chord}(\ )$ indicates a chord distance, $(\bullet)^H$ indicates a Hermitian transpose, and $\|\bullet\|_F$ indicates a Frobenius norm (defined at http://mathworld.wolfram.com/FrobeniusNorm-.html).

A method of computing the distance between the first pre-coding matrix and the second pre-coding matrix may for example further employ the equation as follows.

$$d_{FS}(F_1, F_2) = \cos^{-1}(det(F_1^H F_2))$$

Wherein, $d_{FS}(\ )$ indicates a Fubini-study distance, $(\bullet)^H$ indicates a Hermitian transpose, and $det(\bullet)$ indicates a matrix determinant.

The computation methods as described above are only examples, and they do not limit the scope of the present disclosure, and those skilled in the art may employ other methods to compute the distance between the first pre-coding matrix and the second pre-coding matrix. In addition, the above pre-coding matrixes F1 and F2 may be a first long-term pre-coding matrix and a second long-term pre-coding matrix respectively.

The above methods change the accuracy of the phase offset mainly according to the distance between a first (long-term) pre-coding matrix and a second (long-term) pre-coding matrix. After the distance is computed from the above methods, the shorter the distance is, the higher accuracy of the phase offset is assigned. After the required accuracy of the phase offset is determined, the remaining bits are assigned to the instantaneous pre-coding matrixes.

In the present disclosure, multiple pre-coding matrixes may be defined to constitute one codebook for indicating a set of multiple pre-coding matrixes corresponding to one or more antenna array(s) or a part of an antenna array. Here, the first long-term pre-coding matrix, the first instantaneous pre-coding matrix, the second long-term pre-coding matrix and the second instantaneous matrix according to the present disclosure all include multiple pre-coding matrixes, and they are respectively referred to as a first long-term codebook, a first instantaneous codebook, a second long-term codebook and a second instantaneous codebook later.

The way of determining respective codebooks (the set of pre-coding matrixes) in a case that two codebooks are used to indicate the pre-coding matrixes of one antenna array will be described below. Here, a long-term codebook corresponding to a long-term channel direction and an instantaneous codebook corresponding to an instantaneous channel direction are determined by taking the first antenna array as an example. For the second antenna array, it can be determined in the same way.

For the long-term codebook, a selection can be made from multiple codebooks which are determined in advance, and the codebooks include but not limited to the following pre-coding matrixes:

1. a DFT (Discrete Fourier Transform) matrix indicated by two bits is employed.

$$\begin{bmatrix} 0 & 0 & 0 & 0 \\ 0 & 90 & 180 & -90 \\ 0 & 180 & 0 & -180 \\ 0 & 270 & 180 & -270 \end{bmatrix}$$

This is a four-antenna codebook with the smallest size.

2. a rotation DFT matrix indicated by three bits is employed.

$$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{bmatrix}$$

Since three bits are used, the present codebook has better spatial granularity than the preceding one.

3. a four-antenna codebook (indicated by four bits) in the fourth generation mobile communication standard Rel-8 is employed.

$$\begin{bmatrix} 0 & 0 & 0 & 0 & 0 & 0 & 0 & 0 & 0 & 0 & 0 & 0 & 0 & 0 & 0 & 0 \\ 0 & 90 & 180 & -90 & 45 & 135 & -135 & -45 & 0 & 90 & 180 & -90 & 0 & 0 & 180 & 180 \\ 0 & 180 & 0 & 180 & 90 & -90 & 90 & -90 & 180 & 0 & 180 & 0 & 0 & 180 & 0 & 180 \\ 0 & -90 & 180 & 90 & 135 & 45 & -45 & -135 & 180 & 90 & 0 & -90 & 180 & 0 & 0 & 180 \end{bmatrix}$$

The spatial granularity of the present codebook is high, and it has a better effect for a separate channel.

A long-term pre-coding matrix (long-term codebook) and its index may be directly determined by selecting from the respective codebooks as described above. For example, if the first codebook is employed, the indexes corresponding to respective pre-coding matrixes are [0 0], [0 1], [1 0], [1 1] respectively; if the second codebook is employed, the indexes corresponding to respective pre-coding matrixes are [0 0 0], [0 0 1], [0 1 0], [0 1 1], [1 0 0], [1 0 1], [1 1 0], [1 1 1] respectively; and if the third codebook is employed, the indexes corresponding to respective pre-coding matrixes are [0 0 0 0], [0 0 0 1], [0 0 1 0], [0 0 1 1], [0 1 0 0], [0 1 0 1], [0 1 1 0], [0 1 1 1], [1 0 0 0], [1 0 0 1], [1 0 1 0], [1 0 1 1], [1 1 0 0], [1 1 0 1], [1 1 1 0], [1 1 1 1] respectively.

In the following, the way of determining an instantaneous codebook of an instantaneous channel direction will be described. Here, the instantaneous codebook may be determined by employing but not limited to the manners as follows.

Instance one. A first instantaneous pre-coding matrix (a first instantaneous codebook), a second instantaneous pre-coding matrix (a second instantaneous codebook) and a phase offset use different codebooks respectively. An instantaneous codebook may be determined as follows: the shortest chord distance <v1, v2> between the respective pre-coding matrixes is maximized, meanwhile it is satisfied that the chord distances between the respective pre-coding matrixes and their corresponding long-term pre-coding matrixes [1 1 1 1] are smaller than a certain preset value, wherein v1 and v2 represent different pre-coding matrixes respectively.

The method can assign fixed numbers of bits to the first instantaneous pre-coding matrix, the second instantaneous pre-coding matrix and the phase offset.

Instance two. The phase offset and the first instantaneous pre-coding matrix or the second instantaneous pre-coding matrix use a joint codebook. The way of employing the joint codebook in the instance two is that: for example, for the case of using three bits to construct the first instantaneous pre-coding matrix, the second pre-coding matrix and the phase offset respectively, it can be changed into that three bits are used to construct the first instantaneous pre-coding matrix, and three other bits are used to construct both the second instantaneous pre-coding matrix and the phase offset, thereby the overhead of three bits are saved, or that three bits are used to construct the second instantaneous pre-coding matrix and three other bits are used to construct both the first instantaneous pre-coding matrix and the phase offset, thereby the overhead of three bits are saved as well. Here, the number of bits constructing the joint codebook is not limited to three, and it may be four or five.

Instance three. The method which is between the instance one and the instance two can employ the joint codebook between the first instantaneous pre-coding matrix and the second instantaneous pre-coding matrix. For example, for the above instances, it can be changed into that three bits are used to construct both the first instantaneous pre-coding matrix and the second instantaneous pre-coding matrix, and three other bits are used to construct the phase offset, thereby the overhead of three bits are saved.

The method has a high flexibility in the assignment of the number of bits.

The numbers of bits constructing the first instantaneous pre-coding matrix, the second instantaneous pre-coding matrix and the phase offset as described above do not limit the scope of the present disclosure, and those skilled in the art may specifically determine the numbers of bits in accordance with the characteristics and requirement of the communication system.

Figure 8:
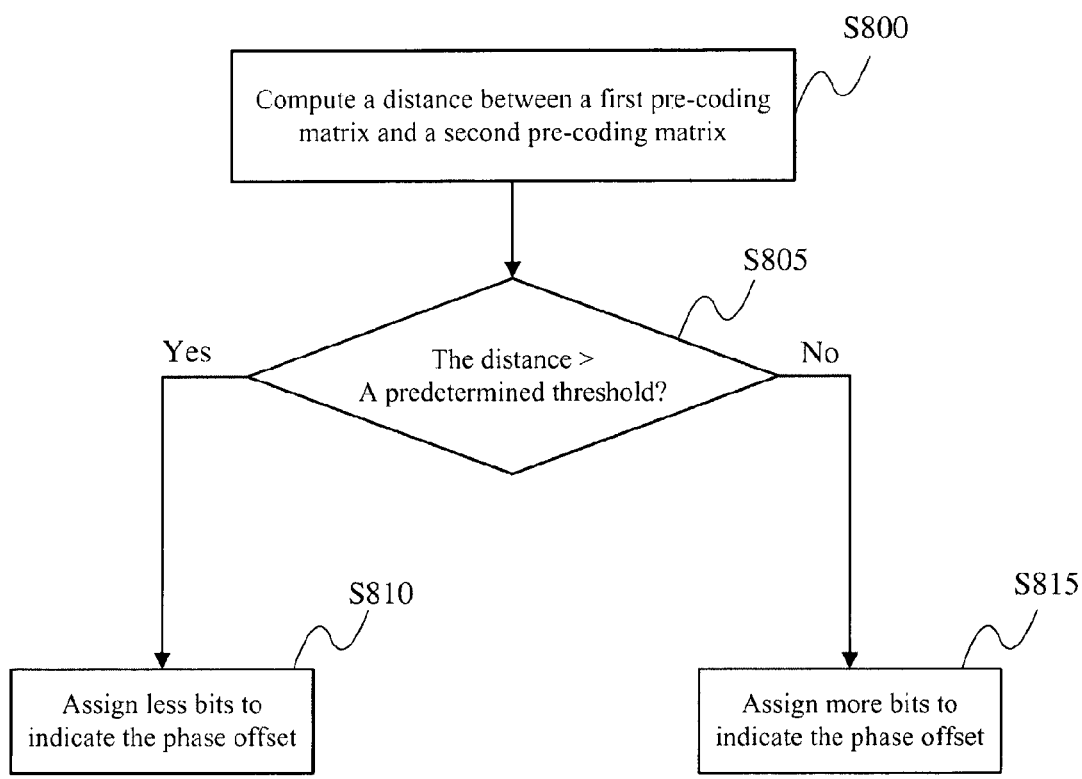
FIG. 8 is a flow chart showing a method of feeding back indexes of a pre-coding matrix of a dual-polarized antenna according to the present disclosure.

FIG. 8 is a flow chart showing a method of feeding back an index of a pre-coding matrix of a dual-polarized antenna according to the present disclosure.

As shown in FIG. 8, in step S800, the distance between a first pre-coding matrix and a second pre-coding matrix is computed. In step S805, it is judged whether the computed distance is larger than a predetermined threshold or not. When the result of judgment in step S805 is positive "Yes", the process proceeds to step S810, otherwise the process proceeds to step S815. In step S810, less bits are assigned to indicate a phase offset. In step S815, more bits are assigned to indicate the phase offset.

The above step S800 may be realized by the computation means 602 of the device 600 according to the present disclosure, the above step S805 may be realized by the judgment means 604 of the device 600 according to the present disclosure, and the above steps S810 and S815 may be realized by the processing means 606 of the device 600 according to the present disclosure.

The method of feeding back the pre-coding matrix index of the dual-polarized antenna according to the present disclosure further includes the step of computing the distance between a first long-term pre-coding matrix and a second long-term pre-coding matrix as the distance between the first pre-coding matrix and the second pre-coding matrix. The step may be realized by the computation means 602 of the device 600 according to the present disclosure.

The above embodiments of the present disclosure are only exemplary description, and their specific structures and operations do not limit the scope of the disclosure. Those skilled in the art can combine different parts and operations in the above respective embodiments to produce new implementations which equally accord with the conception of the present disclosure.

Embodiments of the present disclosure may be implemented by hardware, software and firmware or in any combination thereof, and the way of implementation does not limit the scope of the present disclosure.

The connection relationships between respective functional elements (units) in the embodiments of the disclosure do not limit the scope of the present disclosure, in which one or multiple functional element(s) may contain or be connected to any other functional elements.

Although several embodiments of the present disclosure has been shown and described in combination with the attached drawings, those skilled in the art should understand that variations and modifications which still fall into the scope of claims and their equivalents of the present disclosure can be made to the embodiments without departing from the spirit and principle of the disclosure.

The invention claimed is:

1. A method of feeding back a pre-coding matrix index of a dual-polarized antenna which has a first antenna array and a second antenna array and is arranged at a base station to which the index of a first pre-coding matrix for the first antenna array, the index of a second pre-coding matrix for the second antenna array and the phase offset between the first pre-coding matrix and the second pre-coding matrix are fed back from a terminal, comprising:
computing a distance between the first pre-coding matrix and the second pre-coding matrix;
judging whether the distance is larger than a predetermined threshold or not; and
assigning fewer bits to indicate the phase offset if the distance is larger than the predetermined threshold, and assigning more bits to indicate the phase offset if the distance is not larger than the predetermined threshold.

2. The method according to claim 1, wherein the first pre-coding matrix comprises a first long-term pre-coding matrix and a first instantaneous pre-coding matrix, and the second pre-coding matrix comprises a second long-term pre-coding matrix and a second instantaneous pre-coding matrix, and the method further comprises the step of
computing a distance between the first long-term pre-coding matrix and the second long-term pre-coding matrix as the distance.

3. The method according to claim 2, wherein the index of the first long-term pre-coding matrix and the index of the second long-term pre-coding matrix are fed back in long periods, and the index of the first instantaneous pre-coding matrix, the index of the second instantaneous pre-coding matrix and the phase offset are fed back in short periods.

4. The method according to claim 2, wherein fixed numbers of bits are used to construct the first instantaneous pre-coding matrix, the second instantaneous pre-coding matrix and the phase offset.

5. The method according to claim 2, wherein after appropriate bits are assigned to indicate the phase offset in accordance with the distance, the remaining bits are assigned to indicate the index of the first instantaneous pre-coding matrix and the index of the second instantaneous pre-coding matrix.

6. The method according to claim 2, wherein a plurality of preocoding matrixes are defined to constitute one codebook, wherein the first long-term pre-coding matrix, the first instantaneous pre-coding matrix, the second long-term pre-coding matrix and the second instantaneous pre-coding matrix are a plurality of pre-coding matrixes respectively, and constitute a first long-term codebook, a first instantaneous codebook, a second long-term codebook and a second instantaneous codebook respectively.

7. The method according to claim 6, wherein the first long-term codebook and the second long-term codebook are selected from a plurality of codebooks which are determined in advance.

8. The method according to claim 7, wherein the first instantaneous pre-coding matrix, the second instantaneous pre-coding matrix and the phase offset use different codebooks respectively.

9. The method according to claim 8, wherein the respective instantaneous pre-coding matrixes are determined in the following way of:
maximizing the shortest chord distance between the respective pre-coding matrixes, while making the cord distances between the respective pre-coding matrixes and their corresponding long-term pre-coding matrixes smaller than a preset value.

10. The method according to claim 7, wherein the phase offset and the first instantaneous pre-coding matrix or the second instantaneous pre-coding use a joint codebook.

11. The method according to claim 7, wherein the first instantaneous pre-coding matrix and the second instantaneous pre-coding matrix use a joint codebook.

12. The method according to claim 1, wherein the distance is computed by using the following equation:

$$d_{chord}(F_{F_1,F_2}) = \frac{1}{\sqrt{2}} \|F_1 F_1^H - F_2 F_2^H\|_F$$

wherein, $F_1$ and $F_2$ indicate the first pre-coding matrix and the second pre-coding matrix respectively, $(\bullet)^H$ indicates a Hermitian transpose, and $\|\bullet\|_F$ indicates a Frobenius norm.

13. The method according to claim 1, wherein the distance is computed by using the following equation:

$$d_{FS}(F_1,F_2) = \cos^{-1}(det(F_1^H F_2))$$

wherein, $F_1$ and $F_2$ indicate the first pre-coding matrix and the second pre-coding matrix respectively, $(\bullet)^H$ indicates a Hermitian transpose, and det $(\bullet)$ indicates a matrix determinant.

14. The method according to claim 1, wherein the number of antennas compriesed in each of antenna arrays is any one of two, four and eight.

15. A device for feeding back a pre-coding matrix index of a dual-polarized antenna which has a first antenna array and a second antenna array and is arranged at a base station to which the index of a first pre-coding matrix for the first antenna array, the index of a second pre-coding matrix for the second antenna array and the phase offset between the first pre-coding matrix and the second pre-coding matrix are fed back from the terminal, comprising:
a computation means for computing a distance between the first pre-coding matrix and the second pre-coding matrix;

a judgment means for judging whether the distance is larger than a predetermined threshold or not; and a processing means for assigning fewer bits to indicate the phase offset if the distance is larger than the predetermined threshold, and for assigning more bits to indicate the phase offset if the distance is not larger than the predetermined threshold.

16. The device according to claim 15, wherein the first pre-coding matrix comprises a first long-term pre-coding matrix and a first instantaneous pre-coding matrix, and the second pre-coding matrix comprises a second long-term pre-coding matrix and a second instantaneous pre-coding matrix, wherein the computation means computs a distance between the first long-term pre-coding matrix and the second long-term pre-coding matrix as the distance.

17. The device according to claim 16, wherein the index of the first long-term pre-coding matrix and the index of the second long-term pre-coding matrix are fed back in long periods, and the index of the first instantaneous pre-coding matrix, the index of the second instantaneous pre-coding matrix and the phase offset are fed back in short periods.

18. The device according to claim 16, wherein fixed numbers of bits are used to indicate the index of the first instantaneous pre-coding matrix, the index of the second instantaneous pre-coding matrix and the phase offset.

19. The device according to claim 16, wherein after appropriate bits are assigned to indicate the phase offset in accordance with the distance, the remaining bits are assigned to indicate the index of the first instantaneous pre-coding matrix and the index of the second instantaneous pre-coding matrix.

* * * * *